United States Patent [19]
Narayan et al.

[11] Patent Number: 5,728,824
[45] Date of Patent: Mar. 17, 1998

[54] MICROFIBER REINFORCED BIODEGRADABLE STARCH ESTER COMPOSITES WITH ENHANCED SHOCK ABSORBANCE AND PROCESSABILITY

[75] Inventors: Ramani Narayan, Okemos; Mahesh Kotnis, Lansing, both of Mich.; Hideyuki Tanaka; Nobuo Miyachi, both of Aichi, Japan

[73] Assignee: Evercorn, Inc., Lansing, Mich.

[21] Appl. No.: 595,062

[22] Filed: Feb. 1, 1996

[51] Int. Cl.⁶ .......................... C08B 31/02; C08B 33/02; C08B 35/02
[52] U.S. Cl. ................................. 536/107; 524/35
[58] Field of Search ........................ 536/107; 524/35

[56] References Cited

U.S. PATENT DOCUMENTS

| | | | |
|---|---|---|---|
| 3,795,670 | 3/1974 | Mark et al. | 536/110 |
| 4,891,404 | 1/1990 | Narayan et al. | 525/54.2 |
| 5,367,067 | 11/1994 | Frische et al. | 536/45 |
| 5,462,983 | 10/1995 | Bloembergen et al. | 524/51 |

*Primary Examiner*—Nathan M. Nutter
*Attorney, Agent, or Firm*—Quarles & Brady

[57] ABSTRACT

Thermoplastic compositions comprising a starch ester and microfibers of cellulose can be formed into biodegradable articles of superior mechanical properties.

14 Claims, No Drawings

MICROFIBER REINFORCED BIODEGRADABLE STARCH ESTER COMPOSITES WITH ENHANCED SHOCK ABSORBANCE AND PROCESSABILITY

FIELD OF THE INVENTION

The invention relates generally to starch based polymers. More particularly, it relates to fiber reinforced, starch ester composites having high mechanical strength, superior shock absorbance and good processability. These starch ester composites are biodegradable and water resistant. They can be thermoplastically processed using conventional processing techniques such as, but not limited to, molding, extrusion, and thermoforming.

BACKGROUND OF THE INVENTION

The properties of starch esters with a degree of substitution (d.s.) of 1 to 3 depend upon the type of starch, chain length of the substituent, and the conditions of activation and reaction (Starch Chemistry and Technology edited by R. L. Whistler et al., page 340). It is known that the important parameters in developing useful biodegradable materials from starch esters are: (1) use of high amylose starch (containing at least 50 wt. % of amylose) as the starch raw material (2) controlled degree of ester substitution between 1.5 to 2.5 to maintain the critical balance of biodegradability and the required water resistance and thermoplasticity. It also is known that neat starch esters or even their plasticized compositions form brittle materials having poor mechanical strength.

The use of starch esters as biodegradable thermoplastic materials is disclosed in the U.S. Pat. No. 5,367,067. This patent claims that plasticized starch ester compositions can be molded or extruded into biodegradable articles, but it does not quantitatively specify the range of properties of such materials. For those skilled in the art, it is known that starch esters by themselves or in combination with plasticizers form brittle materials with poor mechanical properties. Hence to exploit the biodegradability of such materials for commercial applications, it is needed to improve their mechanical strength, their ability to absorb shock, and processability to have high speed production capabilities. It would be desirable to have compositions which overcome these deficiencies and extend the potential for starch ester materials to be used as biodegradable materials for commercial applications by achieving the critical balance of mechanical strength, shock absorbance ability, and processability; all of which are key considerations for commercial product development. It also would be desirable to have biodegradable fiber reinforced starch ester composites from which articles can be produced by thermoplastic processing techniques.

SUMMARY OF THE INVENTION

One objective of the present invention is to disclose biodegradable starch ester compositions which have superior mechanical properties, higher shock absorbance ability and better processability than the starch ester compositions disclosed in the previous literature, including patents.

Another objective is to disclose new compositions which can be processed thermoplastically by techniques such as, but not limited to, extrusion, molding and thermoforming.

It is a further object to disclose biodegradable articles which are more water resistant and dimensionally stable than prior art articles.

We have discovered that the incorporation of certain cellulose fibers into a starch ester in which the ester moiety has 2 to 18 carbon atoms unexpectedly provides significant mechanical reinforcement to products made from the starch ester, and it increases the ability of the products to absorb shock while maintaining the thermoplastic processability and complete biodegradability of said products.

We have found that the nature and the external dimensional size of the cellulose fibers to be added are critical to obtain the desired balance of mechanical reinforcement and processability for starch ester compositions. The cellulose fibers we have found to be useful have average lengths of about 75 to 750 microns, average diameters of 10 microns to 80 microns, and length to diameter (L/D) ratios of about 3 to about 60. We refer to these fibers as "microfibers" herein.

We also have discovered that certain biodegradable liquids can be added to the microfibers to enhance their processability by several orders of magnitude.

In a preferred embodiment of the invention, the starch esters are starch acetates having a range of d.s. 1.0 to 2.5 and the cellulose microfibers have L/D ratios of about 3 to 30. The novel products made from these compositions have been found to be biodegradable using the ASTM D-5338 test method.

DETAILED DESCRIPTION OF THE INVENTION

In the preferred practice of the present invention, a starch acetate having a d.s. of about 1.0 to about 2.5 is mixed with about 5 to about 40% by weight of cellulose microfibers having average lengths of about 100 microns to 600 microns and L/D ratios of 6 to 12, which have been previously wetted with about 1% to about 10% by weight of epoxidized soybean oil, and about 5% to about 25% by weight of triacetin as a polyester plasticizer. The resulting composition is readily molded into biodegradable products having superior mechanical properties.

Among the esters which can be used in the present invention are starch acetate, starch propionate, starch butyrate, starch caproate, starch caprylate, starch laurate, starch palmitate and starch stearate, starch acrylate, starch crotonate and starch oleate.

The preferred starch ester for use in the present invention is starch acetate. It is the most widely investigated ester in the literature. Especially preferred for use in the present invention are starch acetates having a d.s. of 1.5 to 2.8.

Several methods of producing the starch esters, including starch acetate, of desired d.s. using acetic anhydride, vinyl acetate, or glacial acetic acid are known in the literature. For purposes of the present invention, we have used the method as described by Mark and Mehltretter in Starke, Volume 3, 1972, pages 73–100 to prepare starch acetates of desired d.s. However, the starch acetates that can be used in this invention are not dependent upon the method of their production as long as they are chemically similar to those produced by the preferred method.

In general, the starch esters that can be used are those starch esters in which the starch starting material contained at least 50% amylose by weight (preferably 70% or more). The starch may be derived from any suitable source such as corn, wheat, peas, oats, sago, potatoes, tapioca, sweet potatoes, etc.

The use of fibers as matrix reinforcements is well known in the production of composite materials for specific applications. However, we have discovered that the dimensional characteristics such as length, (L), and length to diameter, (L/D) ratio, chemical composition, wt. % loading, and mechanical properties of the fiber together with surface performance of the fiber can be very important to obtaining the necessary degree of fiber-matrix compatibility, mechanical reinforcement, and processability. Examples of organic fibers that have been used as reinforcement are cellulosics, lignocellulosics, while examples of synthetic fibers are rayons, nylons, polyesters, glass, etc. Depending upon the length of fiber, it is usually classified as flock fiber, chopped fiber, staple fiber or milled fiber. Chopped and staple fibers have lengths in the range of 20 to 1,400 microns while milled fibers have lengths from 1000 to 6000 microns. All of them are used as reinforcements in polymeric matrices to produce composite materials. Flock fibers are typically in the range of 100–400 microns length (30 to 100 mesh sizes) and have been used in thermosetting materials for improved processability and mechanical reinforcement. (Plastics Compounding For Resin Producers, Formulators And Compounders, 1991, page 97).

The fibers we have found to be useful in making the starch ester compositions of the present invention are cellulose microfibers having an average length of 75–750 microns and a length to diameter (L/D) ratio of 3 to 60.

The preferred cellulose microfibers are lignin free, cellulose fibers having an average length of about 100 to about 300 microns, average diameters of about 10 to 30 microns and an L/D ratio of 6 to 15. These fibers are available from Protein Technologies International of St. Louis, Mo. under the product name Solka-Floc. In addition to microfibers from natural sources, such as cotton, oat, other seed fibers, (bombax cotton, and kapok, etc.), bast fiber (hemp, flax), leaf fiber (Manila hemp) and regenerated cellulose fibers. Semisynthetic and synthetic cellulosic microfibers, such as acetate rayon can be used.

We have discovered that the use of cellulosic microfibers in the range of 100–750 microns length in amounts ranging from about 1% to about 60% as based on the weight of the starch ester provide improved mechanical properties and high processability. We have discovered that the cellulose microfibers behave in a unique way that other biodegradable fibers, such as ligno-cellulosic fibers or proteinous fibers having similar dimensional characteristics as those of the cellulose fibers do not. Also we have found that the use of cellulose fibers outside the range of about 75 to about 750 microns range in length and L/D ratios of 3 to 60 do not offer the unexpected advantages of mechanical reinforcement and processability, yet maintaining the requirement of complete biodegradability.

The mechanism by which the cellulose microfibers provide the unique advantages is not known. However, it appears to have something to do with the characteristic dimensions of fibers as well as the chemical composition of fibers which offer the mechanical and chemical compatibility with the starch ester matrix. The similarities in the chemical nature of cellulose fibers and the starch matrix together with the surface performance of the fiber perhaps play a key role in this behavior. This is further illustrated by Example 4 where cellulose microfiber was blended with polystyrene matrix and the resulting composite was seen to have poorer properties as compared to the neat polystyrene showing that cellulose microfiber is not compatible with polystyrene matrix.

We also have discovered that certain wetting agents such as, epoxidized soybean oil when used as processing aids (about 1% by weight to 10% by weight of total composition) further enhance the melt flow characteristics of these microfiber reinforced starch ester composites.

The preferred wetting agents are epoxidized soybean oil and epoxidized fatty acids. Other wetting agents that can be used usually to lesser advantage are soybean oil, linseed oil, castor oil, fatty acids and low molecular weight linear aliphatic polyesters, such as polycaprolactone, polyalkanoates, and polylactic acid.

The use of epoxidized oils or fatty acids is unique since there is potential for reaction between the epoxide group of the oil or the acid with the hydroxyl groups of the starch ester and the cellulose fibers, thereby further increasing the compatibility between the fiber and the matrix. The reactions between the epoxide group and the hydroxyl group are known to be promoted by certain catalysts. We have found that even without using a catalyst, the use of epoxidized oil in amounts as low as 2 wt. % can increase the Melt Flow Rate (MFR) by 10 fold. This effect is truly remarkable in its magnitude.

We also have observed that the method of addition of the epoxidized oil to the composite plays a key role in enhancing the processability. The cellulose microfibers have significant ability to absorb the oil on a wt. % basis. Oil can be added to the fiber alone, and if this pretreated fiber is mixed with the starch ester matrix, then the resulting composites have even higher MFR than composites in which oil, fiber, and starch ester were mixed together to have the same quantity of oil.

The compositions of the present invention also can include one or more members selected from the group of plasticizers, colorants, stabilizers, deodorizing agents, flame retardants, lubricants, mold release agents, and mixtures thereof.

The preferred plasticizers are low molecular weight ester-type plasticizers, such as triacetin, tripropionin and triethyl acetylcitrate. Other plasticizers also can be used for some applications.

When evaluating the mechanical properties of polymers, tests such as notched Izod impact strength, flexural and tensile strains at break, energy required to break (integrated area under stress-strain curve), dart impact strength (falling weight method) tests are typically used to determine the shock resistance of the material. Each of these tests measures different aspect of the shock resistance; e.g. notched Izod is a measure of crack sensitivity while the energy required for break is a measure of material's resistance for crack initiation and propagation. Two different materials can have same notch sensitivity (notched Izod values) but significantly different toughness or shock resistance in unnotched condition. The area under the stress-strain curve (energy required to break) is an useful measure to distinguish the behavior of such materials.

In order to evaluate the compositions of the present invention, we produced molded articles from the starch acetate of d.s. 2.1+plasticizer compositions and further, from 2.1+talc +plasticizer compositions. These formulations are referred to as control formulations in Example 2. As is known from the prior art, we found that the mechanical strength of the starch acetate+plasticizer compositions was poor and that these samples were very brittle. We found that the mechanical strength of the compositions was only marginally improved by using talc as the particulate filler, but that these samples were also relatively brittle. Because of their inability to resist shock there is a serious hurdle in finding commercial applications for starch acetate based materials as biodegradable alternatives to the conventional non-degradable petrochemical based plastics, such as polystyrene or polyethylene. In order to gain commercial acceptance starch ester based materials should require the same ratio of the energy to break compositions containing them as compositions of general purpose polystyrene as a quantitative measure of their relative ability to resist shock or impact. The ratios for tensile and flexural tests, designated as RT and RF respectively, for the control starch acetate compositions are less than 1.0, showing that the control materials required a lesser amount of energy to fracture than compositions of general purpose polystyrene.

We have discovered, however, that formulations of starch acetate of having a d.s. of about 2.1 when combined with cellulose microfibers, having L in the range of 75–750 microns and L/D ratio of 6–30, had higher mechanical strength and more importantly had higher ability to absorb shock than the control starch acetate+plasticizer and starch acetate+plasticizer+talc compositions. The ratios RT and RF for all of the microfiber reinforced composites of the present invention were in the range of 1.5–3.0 showing that these materials require higher energy to fracture than the control starch ester formulations. In fact, the fiber reinforced starch acetate compositions of the present invention had even better properties than that of general purpose polystyrene as shown in TABLE 1 of Example 2. In addition, as seen in the TABLE 1, these compositions had a very high processability even at such high fiber loading of 30 wt. % based on the total weight. These surprising improvements in mechanical strength, in the ability to absorb shock, and in the processability of the fiber reinforced starch acetate compositions of the present invention have been never reported before for starch acetate compositions and offer a tremendous potential for the use of starch acetate in developing commercial biodegradable products which can have the same performance as products made of conventional petrochemical based plastics such as polystyrene.

The present invention is further illustrated by the following examples:

EXAMPLE 1

Production of High Amylose Starch Acetate

Production of starch acetate of d.s.=3.0 using acetic anhydride as the acylation agent is described in detail by Mark and Mehltretter (supra). The same technique was used to make the starch acetate of the present example from high amylose corn starch except that the amount of anhydride used was reduced to give a final product with a d.s. intermediate between 2.0 and 3.0.

In preparing the high amylose starch ester of this example 2660 grams of Hylon-7 corn starch (National Starch and Chemicals Inc.) (70% amylose) was dried to 0.2 wt. % moisture. The starch was added to the 5 gallon reactor (Morehouse-Cowles 2J-14 Dissolver). The cover was closed and 6815 grams of acetic anhydride was added in to the reactor via the addition tank (3 gallon pressure tank, pressured by nitrogen). The mixer was then turned on to the desired settings, 100 rpm (anchor/wall scraper) and 2750 rpm (emulsifier). The tempered water system was turned on and set to 80° C. Once the temperature had stabilized, 796 grams of sodium hydroxide solution in water (50% of NaOH by wt.) was added through the addition tank (2 liter pressure vessel pressured by nitrogen). When addition had begun, the set temperature was raised to 120° C. The sodium hydroxide solution was added within 6–14 minutes. This will vary in order to control the temperature between 120°–130° C.; 65 minutes after first adding the NaOH solution, the system was cooled down by the tempered water system. When the temperature was less than 100° C., the reactor was opened up and an ice/water mixture was added to precipitate the mixture. The reactor was closed and allowed to mix until the temperature came down to 35° C. or less (about 10 minutes).

The reactor was opened and the product was scooped out and put into a large tank (with agitation) half filled with water. Sodium bicarbonate was added slowly to the agitated tank to neutralize the acid produced in the reaction. 7490 grams of sodium bicarbonate were required. Antifoam agent was added to control the foaming. Once neutralized to a pH of 7.0, the product was transferred to a pressure filter. The product was washed 5 times with water to dissolve the salt. The filtered product was allowed to dry overnight before it was put in the convection oven at 50°–60° C. The product was dried to 0.2–0.5 wt. % moisture. The d.s. of the product was determined by 300 Mhz proton NMR to be 2.1.

EXAMPLE 2

Biodegradable Composites of Starch Acetate and Cellulose Fibers With Improved Shock Absorbance Starch acetate of d.s. 2.1 was prepared by the process described in Example 1. It was dried to have the final moisture content of ~0.5 wt. %. Several formulations of starch acetate with cellulose fibers and plasticizers were prepared and evaluated for mechanical and processability properties. Different cellulose fibers in the range of length, L from 55 to 1600 microns and length to diameter ratio, L/D of 3 to 35 were used. The best properties were obtained for fibers in the range of L=100°–750 microns with L/D in the range of 6 to 30 (herein referred to as "microfibers"). Composites of starch acetate and the cellulose microfibers possessed excellent mechanical properties and processability at fiber loadings of 10–40 wt. %. The properties of representative formulations using cellulose microfibers of varying L and L/D are shown in Table 1.

Formulations of starch acetate with cellulose fibers and biodegradable plasticizers were prepared by mixing the components in a Teledyne-Readco blender (model Labmaster-II). Three other formulations of starch acetate with talc and a plasticizer were also prepared as controls to bring out the uniqueness of starch acetate and cellulose fiber compositions in terms of mechanical properties, especially improved shock resistance. A fourth control of neat general purpose polystyrene was used to show that the starch acetate+cellulose fiber compositions have better or comparable mechanical properties to those of general purpose polystyrene. Each of these formulations was extruded on a Baker-Perkins twin screw extruder (model MPC-30) through a strand die and then pelletized on a Killion pelletizer. A typical temperature profile for extrusion was 100° C. (feed), 155, 165, 165° C. (die). The compounded resin pellets were molded into ASTM test specimens on an Arburg injection molding machine (model Allrounder 221). A typical temperature profile for molding was 190° C. (feed), 200, 200, 210° C. (nozzle). The processability of the formulations was judged by the ease of processing and the quality of processed parts. The ease of processing was in turn judged by the extruder load at a fixed feed rate during compounding and by melt temperature and injection pressures required to obtain good quality parts during injection molding. A rating on a scale of 1–10 with 1=worst and 10=best is shown for each of these formulations in Table 1.

The test specimens were conditioned at 50% relative humidity (RH) and 23° C. for 48 hours and then were evaluated for mechanical properties using ASTM test procedures. Tensile testing was performed according to ASTM D-638 standard using type-I specimens on United Tensile System testing machine (model SFM-20) at a crosshead speed of 0.025 inch/min. Flexural testing was performed according to ASTM D-790 standard using 0.125 inch thick specimens with a crosshead speed of 0.05 inch/min and a support span of 2 inches. Notched Izod impact testing was performed using ASTM D-256 on a Testing Machines Inc. Izod impact tester (model TMI-43-1) with a 1 lb pendulum. The area under the stress (lbs)-strain (% inch/inch) curve was calculated by numerical integration for both the tensile and the flexural tests data, and was used as a measure of the capacity of the material to absorb energy before breaking. For each formulation, the area under the stress-strain curve was normalized by the corresponding area for polystyrene. This ratio serves to compare the performance of the particular formulation to that of the general purpose polystyrene (PS). The values greater than 1.0 mean more fracture energy than that of the general purpose PS, suggesting higher ability to absorb shock before mechanical failure.

Table 1 clearly shows that the microfiber reinforced composites of starch acetate of the present invention possess mechanical properties and impact resistance superior to the talc filled starch acetate or the neat starch acetate. The improved shock resistance of these fiber reinforced formulations make them viable for commercial applications like disposable plastic cutlery, cups, plates and other single use disposable items etc. The poor shock resistance is a significant drawback of the particulate filled or neat starch acetate compositions.

The same procedure to make fiber reinforced composites can be repeated for producing composites of any thermoplastic starch acetate of any d.s. between 1.5 to 3.0 and for any thermoplastic starch ester with suitable modifications in the processing conditions as per the particular requirement.

EXAMPLE 3 (Comparison)

Blends of Starch Acetate With Ligno-Cellulosic Microfibers (Wood Fibers)

Starch acetate of d.s. 2.1 was prepared by the method described in Example 1. The final product was dried to 0.5 wt. % moisture level and was blended with wood fibers to prepare compositions as shown in Table 2. The experimental procedure for blending, compounding, injection molding of ASTM test specimens and testing was similar to the one outlined in detail in Example 2. The wood fibers of L=75 microns and L=200 microns were obtained from American Wood Fibers as grades 12010 and 6010 respectively. Both of these fibers were dried to a moisture content of 0.5 wt. % in a vacuum oven at 90° C. for 12 hours before blending with starch acetate. The mechanical and processing properties of these formulations are shown in Table 2.

Unlike the cellulose microfiber compositions described in example 1, the ligno-cellulosic wood fibers (in the same L and L/D range) did not offer the same reinforcement in mechanical properties, especially in energy required to break, and also possessed very poor processability.

EXAMPLE 4 (Comparison)

Blends of General Purpose Polystyrene With Cellulose Microfibers

General purpose polystyrene (PS) of grade Fina 500 was obtained from Fina Oil and Chemical Co. It was blended with a cellulose microfibers of L=300 microns and L/D=12. The fiber was dried to ~0.5 wt. % moisture content before blending. The experimental procedure for blending, compounding, injection molding, and testing was identical to the one outlined in Example 2. The composition and mechanical properties of the PS-cellulose microfiber blend are shown in Table 3 along with those of GP-PS.

The cellulose microfiber of L=300 microns and L/D=12 did not improve the mechanical properties of the polystyrene and in fact gave it very poor processability. However; the same size microfibers at similar fiber loading concentrations was shown to dramatically improve the mechanical properties of starch acetate matrix in Example 1.

EXAMPLE 5

Biodegradable Blends of Starch Acetate With Cellulose Microfibers With Enhanced Melt Flow Characteristics Starch acetate of d.s. 2.1 prepared by the method as described in Example 1 and of moisture content 0.5 wt. % was blended with cellulose microfiber (L=300 microns and L/D=12), triacetin as a plasticizer, and epoxidized soybean oil (ESO). ESO was obtained from Elf Atochem of grade Vikoflex 7170. These formulations were compounded, molded in to ASTM test bars, and were evaluated as described in earlier examples. It was observed that the addition of ESO to the blends of starch acetate and cellulose fibers enhanced the processability to a significant extent. Further it was also observed that the method of addition of ESO made a substantial difference in the processability of these blends. In the first method, ESO was added to the starch acetate and fiber mixture, as was added the plasticizer, and the total mixture was blended in the Teledyne-Readco blender. In the second method, ESO was first added to the fiber alone. The fiber readily absorbed the oil. This "soaked" fiber was then blended with starch acetate and plasticizer in the Teledyne-Readco blender. Each of these formulations was then compounded using identical processing conditions. It was observed that the latter method of formulation surprisingly yielded pellets having superior melt flow characteristics. This is illustrated in Table 4.

Melt flow rate (MFR) was measured at 200° C./5kg load using ASTM D-1238 standard on Ray-Ran melt flow indexer (model MK-II). MFR values (units of g/10 min) are conventionally used to quantify the flow characteristics of polymeric materials. Table 4 shows that the MFR of the control composition containing only the starch acetate, microfiber, and plasticizer was improved 10–15 fold by the addition of ESO in the formulation as shown by examples 6–1, 6–2, 6–5, and 6—6. Table 4 also shows the dramatic effect of addition of ESO to the fiber alone and then formulating this "soaked" fiber with starch acetate and plasticizer through examples 6–3, 6–4, 6–7, and 6–8. The MFR values of these samples were almost 25–45 times that of the control formulation.

The compounded pellets from the compositions shown in Table 4 were injection molded into ASTM test specimens and were evaluated for mechanical properties. These formulations, and especially with 2 wt. % ESO, showed higher elongations to break in tensile and flexural tests and also high values for energy to break.

EXAMPLE 6

Injection Molded Articles of Fiber Reinforced Starch Acetate Compositions

Injection molded articles like spoons, forks, knives, plates, cups, golf tees, etc. were produced to show the viability of the starch acetate and microfiber formulations for commercial applications. These articles were compared to the articles produced from compositions containing starch acetate, talc, and plasticizer for their performance, especially for shock resistance.

Spoons, forks, and knives were molded from the compositions 2-1, 2—2, and 2-8 as well as from the control talc-containing compositions 2-1C and 2—2C of Table 1. The cutlery parts molded from the starch acetate and microfiber compositions were clearly superior in mechanical properties, especially in shock absorbance to those of the starch acetate and talc compositions. Cups were molded from the compositions 2-8 and 2—2C of Table 1. The cups molded from the microfiber containing compositions were more shock resistant than the those molded from the talc-containing composition. Similar observations were made for the plates which were molded from the compositions 2-6 and 2—2C of Table 1.

Cutlery parts were molded from the compositions of Table 4, which contained ESO. The cutlery parts produced were even more flexible and shock resistant than the microfiber containing compositions without ESO, e.g. control formulation in Table 4.

EXAMPLE 7

Extruded Films From Starch Acetate (d.s. 2.1) Compositions Containing Triacetin And Cellulose Starch acetate of d.s. 2.1 was prepared by the process described in Example 1. Formulations of starch acetate with triacetin and cellulose microfibers (L=300 microns, L/D=12) were prepared using the procedures described in earlier examples. Formulations of starch acetate with 20 and 30 wt. % fiber each with 15 and 20 wt. % triacetin (all based on total weight) were extruded on a Killion single screw extruder in the form of sheets with good surface quality and flexibility.

TABLE 1

| | Formulations in Example 2 (All ingredients in percent by weight of total composition) | | | | | | | |
|---|---|---|---|---|---|---|---|---|
| Component | 2-1 | 2-2 | 2-3 | 2-4 | 2-5 | 2-6 | 2-7 | 2-8 |
| Starch acetate (d.s. 2.1) | 63 | 61 | 58 | 55 | 71 | 68 | 65 | 59.5 |
| Triacetin | 7 | 9 | 12 | 15 | 9 | 12 | 15 | 5.25 |
| Acetyl triethyl citrate | — | — | — | — | — | — | — | 5.25 |
| Cellulose fiber 120 μ (L/D = 6) | 30 | 30 | 30 | 30 | 20 | 20 | 20 | 30 |
| Talc | — | — | — | — | — | — | — | — |
| PS | — | — | — | — | — | — | — | — |
| Mechanical Properties: | | | | | | | | |
| Tensile Strength Psi | 7619 | 7322 | 6752 | 5280 | 5701 | 6013 | 4886 | 7641 |
| Elongation @ break % | 2.1 | 2.8 | 3.1 | 3.3 | 2.0 | 3.2 | 3.3 | 2.9 |
| Tensile Modulus Kpsi | 593 | 520 | 510 | 470 | 480 | 420 | 390 | 586 |
| Flexural Strength Psi | 12459 | 10265 | 10970 | 8596 | 10906 | 10396 | 8635 | 11648 |
| Flexural Modulus Kpsi | 703 | 620 | 642 | 550 | 540 | 510 | 460 | 692 |
| Notched Izod ft-lb/inch | 0.32 | 0.32 | 0.34 | 0.36 | 0.23 | 0.24 | 0.24 | 0.35 |
| RT = AT/AT (PS) | 1.9 | 3.1 | 2.83 | 2.4 | 1.30 | 2.7 | 2.2 | 2.7 |
| RF = AF/AF (PS) | 1.9 | 1.9 | 2.0 | 1.53 | 1.5 | 2.2 | 2.0 | 2.0 |
| Processability on a 1–10 scale 1 = worst 10 = best | 6 | 7 | 8 | 8 | 8 | 9 | 8 | 7 |

| | Formulations in Example 2 | | | | | Controls in Example 2 | | |
|---|---|---|---|---|---|---|---|---|
| Component | 2-9 | 2-10 | 2-11 | 2-12 | 2-1C | 2-2C | 2-3C | 2-4C |
| Starch acetate (d.s. 2.1) | 68 | 63 | 68 | 59.5 | 63 | 61 | 85 | — |
| Triacetin | 12 | 7 | 12 | 5.25 | 7 | 9 | 15 | — |
| Acetyl triethyl citrate | — | — | — | 5.25 | — | — | — | — |
| Cellulose Fiber 300 μ (L/D = 12) | — | — | 20 | 30 | — | — | — | — |
| Cellulose Fiber 1600 μ (L/D = 8) | 20 | 30 | — | — | — | — | — | — |
| Talc | — | — | — | — | 30 | 30 | — | — |
| PS | — | — | — | — | — | — | — | 100 |
| Mechanical Properties | | | | | | | | |
| Tensile Strength Psi | 4182 | 4225 | 4995 | 6345 | 4434 | 4491 | 3000 | 5400 |
| Elongation @ break % | 2.1 | 1.1 | 3.1 | 3.1 | 1.1 | 1.3 | 1.3 | 1.5 |
| Tensile Modulus Kpsi | 448 | 510 | 350 | 461 | 690 | 580 | — | 400 |
| Flexural Strength Psi | 9434 | 8556 | 7824 | 11623 | 10435 | 7618 | 6850 | 10004 |
| Flexural Modulus Kpsi | 481 | 756 | 370 | 548 | 1020 | 690 | 280 | 460 |
| Notched Izod ft-lb/inch | — | — | — | 0.40 | 0.25 | 0.25 | 0.25 | 0.28 |
| R = AT/AT (PS) | 1.8 | 0.5 | — | 2.7 | 0.5 | — | — | 1.0 |
| R = AF/AF (PS) | 1.0 | 0.5 | — | 2.0 | 0.6 | — | — | 1.0 |
| Processability on a 1–10 scale 1 = worst 10 = best | 2 | 1 | 8 | 7 | 6 | 7 | 5 | 10 |

RT is the ratio of the areas under the stress-strain curve of the sample to that of the PS in the tensile test. RF is the similar ratio in the flexural test.

TABLE 2

| | Formulations in Example 3 (All ingredients in percent by weight of total composition) | |
|---|---|---|
| Component | 3-1 | 3-2 |
| Starch Acetate | 63 | 63 |
| Triacetin | 7 | 7 |
| ATEC | — | — |
| Wood Fiber 6010 (~75 μ) | 30 | — |
| Wood Fiber 12010 (~200 μ) | — | 30 |
| Mechanical Properties | | |
| Tensile Strength Psi | 5915 | 3967 |
| Elongation @ break % | 1.3 | 0.8 |
| Tensile Modulus Kpsi | 574 | 561 |
| Flexural Strength Psi | 10624 | 7731 |
| Flexural Modulus Kpsi | 675 | 725 |
| Notched Izod ft-lb/inch | 0.23 | — |
| R = AT/AT (PS) | 0.9 | 0.3 |
| R = AF/AF (PS) | 0.8 | 0.3 |
| Processability on a 1–10 scale 1 = worst 10 = best | 2 | 1 |

RT is the ratio of the areas under the stress-strain curve of the sample to that of the PS in the tensile test. RF is the similar ratio in the flexural test.

TABLE 3

| | Formulations in Example 4 (All ingredients in percent by weight of total composition) | |
|---|---|---|
| Component | 4-1 | 2-4C |
| Starch Acetate | — | — |
| Triacetin | — | — |
| ATEC | — | — |
| Cellulose Fiber 300 μ (L/D = 12) | 30 | — |
| PS | 70 | — |
| Mechanical Properties | | |
| Tensile Strength Psi | 4796 | 5400 |
| Elongation @ break % | 1.7 | 1.5 |
| Tensile Modulus Kpsi | 468 | 400 |
| Flexural Strength Psi | 9201 | 10004 |
| Flexural Modulus Kpsi | 626 | 460 |
| Notched Izod ft-lb/inch | — | 0.28 |
| R = AT/AT (FS) | 1.0 | 1.0 |
| R = AF/AF (PS) | 0.7 | 1.0 |
| Processability on a 1–10 scale 1 = worst 10 = best | 2 | 10 | mixtures of different starch esters or mixed starch ester can be prepared using the methods disclosed herein. Further, the starch used to make the starch acetate in the examples of this invention was high amylose corn starch, but again, the cellulose can be from other sources. As previously stated, the amylose content of the starch should be above 50% and, preferably about 70 wt. % with respect to that of the starch.

It will be apparent to those skilled in the art that a number of modifications and changes can made without departing from the spirit and scope of the present invention. Therefore, it is intended that the invention be limited only by the claims.

We claim:

1. A thermoplastic composition comprising a starch ester having a d.s. in the range of about 1.0 to about 3.0 and about 5% to about 50% by weight of the composition of cellulosic microfibers having an average length of from about 75 to about 750 microns, an average diameter of about 10 to 80 microns and a L/D of about 3 to 60.

2. A thermoplastic composition of claim 1, wherein the thermoplastic composition contains a member selected from the group consisting of soybean oil, epoxidized soybean oil, fatty acids, epoxidized fatty acids and low molecular weight linear aliphatic polyesters.

3. A thermoplastic composition of claim 1 in which the starch is at least 50% amylose by weight.

4. A thermoplastic composition of claim 1 in which the starch ester has an ester moiety containing 2 to 18 carbon atoms.

5. A thermoplastic composition of claim 1 in which the starch ester has a d.s. of about 1.5 to about 2.8.

6. A thermoplastic composition of claim 1 in which the starch ester is derived from the reaction of starch with a carboxylic acid halide, an acid anhydride or a vinyl ester.

7. A thermoplastic composition of claim 1 in which the cellulose fiber is a natural fiber.

8. A thermoplastic composition of claim 1 in which the cellulose fiber has an average length of 100 to 300 microns.

9. A thermoplastic composition of claim 1 which contains a plasticizer.

10. A method of preparing a thermoplastic composition of superior processability said method comprising thoroughly blending a starch ester having a DS of about 1 to about 3 with microcellulose fibers which have been treated with a wetting agent.

11. An article made from a composition of claim 1.
12. An article made from a composition of claim 5.
13. An article made from a composition of claim 8.

TABLE 4

| | Formulations in Example 5 (All ingredients in percent by weight of total composition) | | | | | | | | |
|---|---|---|---|---|---|---|---|---|---|
| Component | 6-1 | 6-2 | 6-3 | 6-4 | 6-5 | 6-6 | 6-7 | 6-8 | Control |
| Starch Acetate | 59 | 59 | 59 | 59 | 56.5 | 56.5 | 56.5 | 56.5 | 61 |
| Triacetin | 9 | 9 | 9 | 9 | 8.5 | 8.5 | 8.5 | 8.5 | 9 |
| Cellulose Fiber 300μ (L/D = 12) | 30 | 30 | 30 | 30 | 30 | 30 | 30 | 30 | 30 |
| ESO | 2 | 2 | 2 (added to fiber) | 2 (added to fiber) | 5 | 5 | 5 (added to fiber) | 5 (added to fiber) | — |
| $Sb_2O_3$ catalyst | 500 ppm | — | 500 ppm | — | 500 ppm | — | 500 ppm | — | — |
| Melt Flow Rate g/10 min 200° C./5 kg | 6 | 6 | 14 | 10 | 9 | 9 | 27 | 18 | 0.6 |

Even though the examples of this invention are based on starch acetate, similar compositions of any starch ester or 14. An article made from a composition of claim 9.

* * * * *